June 5, 1951 W. G. KOGEL 2,555,345
DEFROSTING MEANS IN ABSORPTION REFRIGERATION
Original Filed July 4, 1942 2 Sheets-Sheet 1
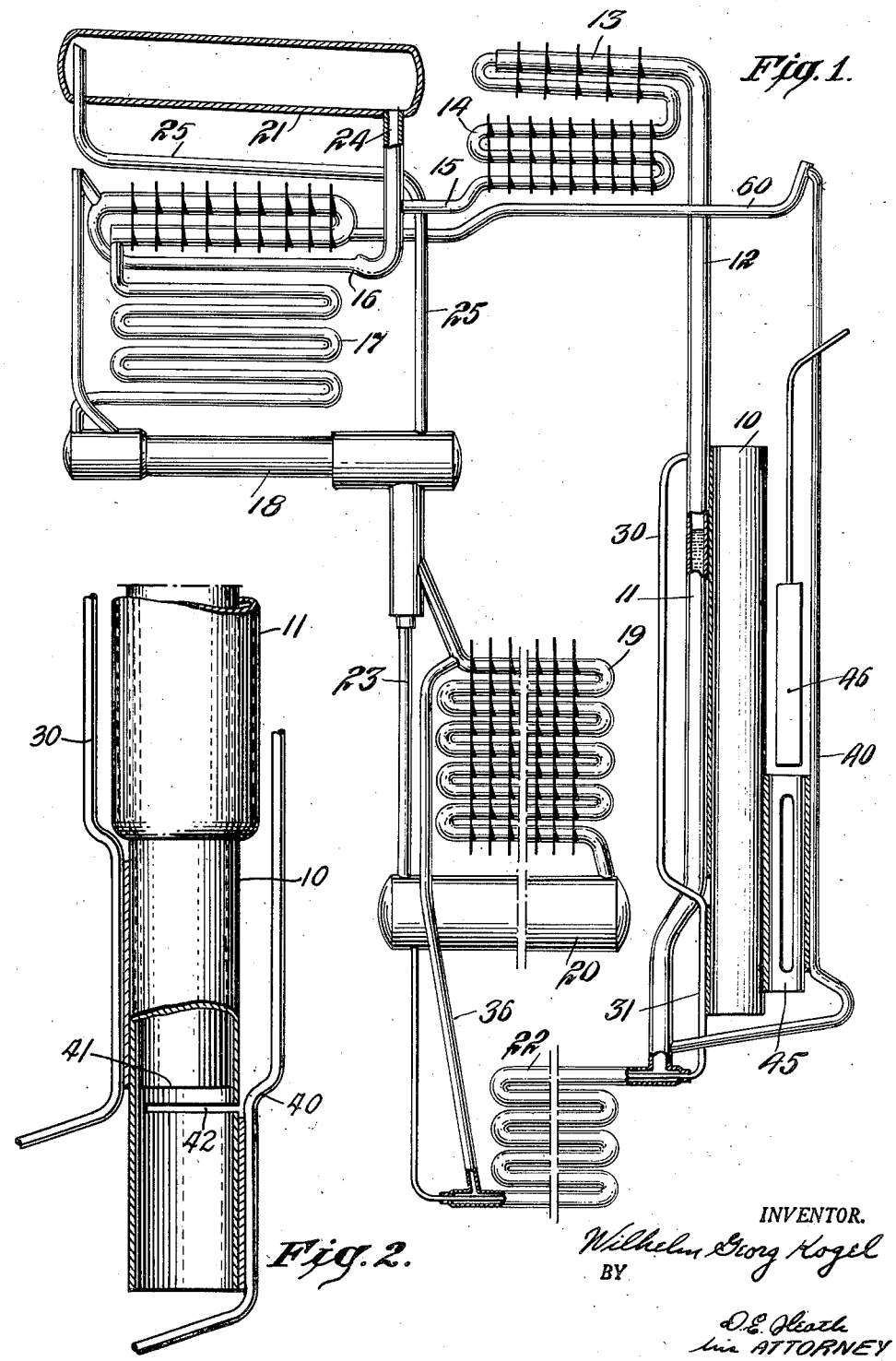
INVENTOR.
Wilhelm Georg Kogel
BY
D.E. Heath
his ATTORNEY June 5, 1951 W. G. KOGEL 2,555,345
DEFROSTING MEANS IN ABSORPTION REFRIGERATION
Original Filed July 4, 1942 2 Sheets-Sheet 2

INVENTOR.
Wilhelm Georg Kogel
BY
D. E. Heath
his ATTORNEY

Patented June 5, 1951

2,555,345

UNITED STATES PATENT OFFICE 2,555,345

DEFROSTING MEANS IN ABSORPTION REFRIGERATION

Wilhelm Georg Kögel, Stockholm, Sweden, assignor to Aktiebolaget Elektrolux, Stockholm, Sweden, a corporation of Sweden Original application July 4, 1942, Serial No. 449,761. Divided and this application December 22, 1945, Serial No. 636,822. In Sweden May 28, 1941

9 Claims. (Cl. 62—119.5)

This is a division of my application Serial No. 449,761, filed July 4th, 1942, for Absorption Refrigerating Apparatus, now Patent No. 2,402,413, granted June 18, 1946.

My invention relates to hermetically closed, continuously working absorption refrigerating apparatus of a pressure equalizing type in which the absorption solution is continuously circulated between the absorber and the boiler during normal operation by a thermosyphon pump, and in which a second auxiliary pump is employed for absorption solution which may be started at will.

In accordance with my invention the auxiliary pump is utilized for conveying absorption solution for purposes other than absorption, more particularly for releasing controlling processes during operation or working of the apparatus. It is especially advantageous to convey this absorption solution to the evaporator for defrosting purposes.

My invention will be hereinafter more fully described partly with reference to the accompanying drawings from which the characteristic features of the invention will be seen.

Fig. 1 shows diagrammatically an absorption refrigerating apparatus with the pump according to the invention.

Fig. 2 shows a further embodiment of the connection between the additional pump and its source of heat.

Figure 3:
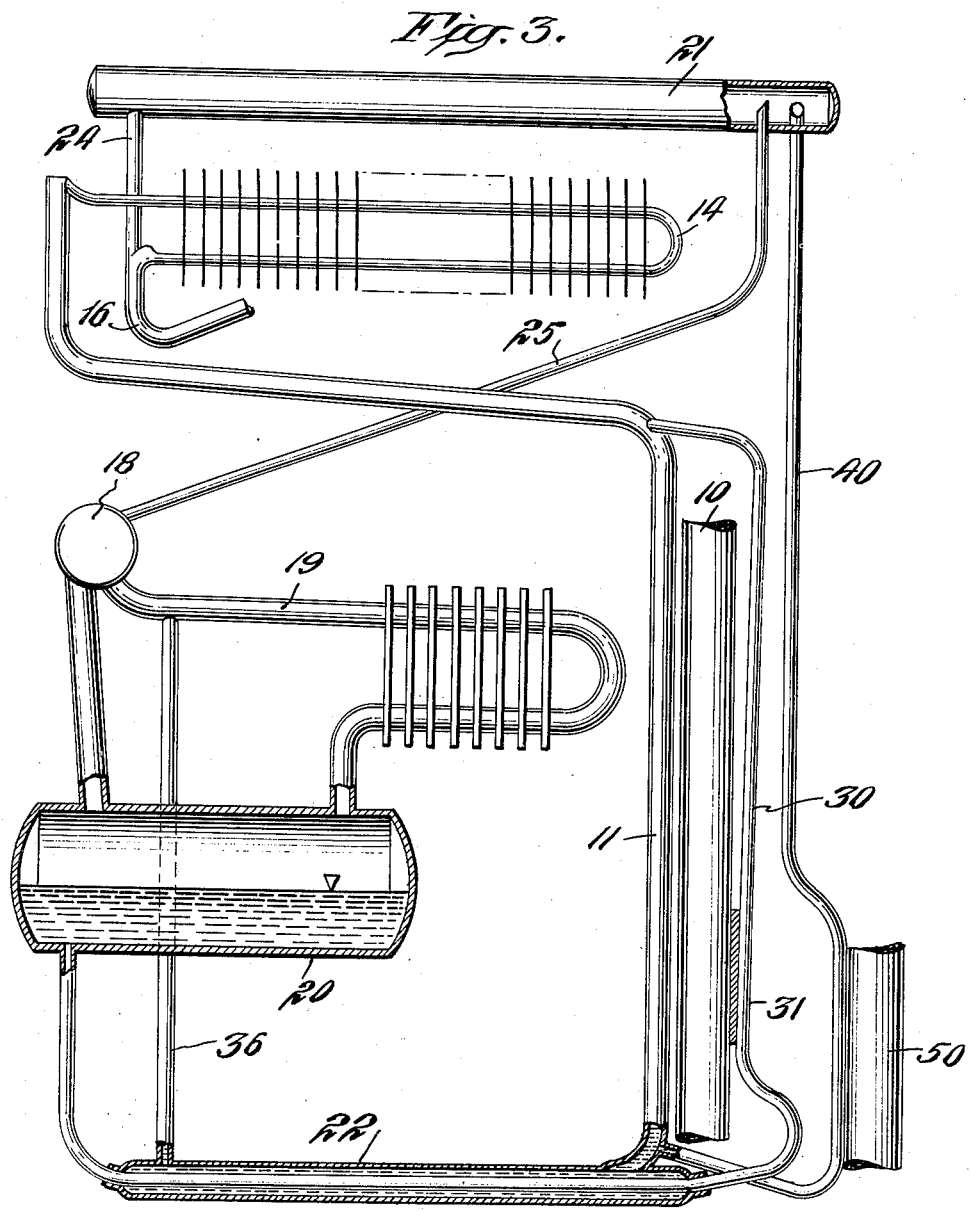
Fig. 3 shows still another embodiment of the invention.

In Fig. 1, 10 designates the heating tube of the refrigerating apparatus to be heated at will, said apparatus working, for example, with water, hydrogen and ammonia. The tubular boiler 11 is connected in heat-conducting relation with the heating tube 10, as by welding, and communicates in a well known manner, through the riser pipe 12, the rectifier 13, the air-cooled condenser 14, conduit 15 and a U-seal 16, with the evaporator 17. The upper part of the evaporator is, in the usual manner, formed as a space cooler and provided with cooling fins. The lower coil part is employed for low temperature cooling, as for ice-making. The gas mixture of ammonia and hydrogen formed in the evaporator passes through the gas heat exchanger 18 and the conduit 23 to the absorber collector 20, and thence upwards through the coil absorber 19 in the usual manner back to the evaporator. Between the condenser 14 and the gas heat exchanger 18 is provided the usual pressure vessel 21 which is connected, on the one hand, by conduit 24 to the condensate conduit 15 and, on the other hand, by conduit 25 to the gas heat exchanger.

The solution from which refrigerant has been expelled in the boiler enters the absorber coil 19 through the heat exchanger 22 and the conduit 36, and passes from the absorber collector 20 through the inner passage of the heat exchanger 22 to the pump 30. This pump is, at point 31, in heat-conducting contact with the heating tube 10. The manner in which apparatus of the kind just described operates is well known in the art.

According to the invention special pump conduit 40 is provided which branches off from the lower part of the boiler 11. The pump tube 40 at its upper end communicates with a conduit 60 which is connected to the upper part of the evaporator 17, but may communicate with the evaporator at another place. The lower part of the pump 40 is, through a slotted sleeve 45, heat conductively connected with the heating tube 10, as by welding. The heat transfer capacity of this sleeve 45 is so low or so reduced by the slots that, in normal cases, the heat transferred through the sleeve 45 to the pump conduit 40 will be insufficient to start the pump 40. If, however, the heat transfer body 46 adapted to fit into the sleeve 45 is lowered into this sleeve, the heat transfer will be so vigorous that the pump 40 will begin to work. This pump raises the hot absorption solution from the boiler to the conduit 60 for flow into the evaporator 17, thereby causing the evaporator to be rapidly defrosted, since the absorption solution is at a temperature varying between +130° and +180° C. This ensures a very rapid defrosting of the evaporator. On the completion of the defrosting process the transfer body 46 is again removed from the sleeve 45. The transfer body 46 may be moved in any manner, both by hand and thermostatically. Especially in the latter case the transfer body 46 is preferably relieved by a counter-weight, not shown.

Fig. 2 shows another method of starting the additional pump. Parts similar to those in Fig. 1 are designated by the same reference numerals.

In the embodiment of Fig. 2 the boiler 11 is shaped as a jacket surrounding the heating tube 10 and only partly shown. The lower end of heating tube 10 is provided with a slit 42 reducing the heat transfer of the heating tube. To the lower part of the heating tube 10 which thus, in normal working, receives little heat, the additional pump 40 is welded or, in some other manner, connected in heat-conducting relationship. This embodiment is especially suited to electric operation. In normal cases the electric heating cartridge 41 is in the raised position shown, thus being effective to heat the circulating pump 30 and the interior of the boiler 11. In this position of the heating cartridge the heat transfer to the pump 40 is so slight that the latter is ineffective to raise solution. If, however, the heating cartridge 41 is lowered by hand or thermostatically, if desired through the medium of levers and springs, not shown, the pump 40 will start and raise the hot solution into the evaporator, since the pump in Fig. 2 is arranged to be connected in the same manner as in Fig. 1 with the lower boiler part or the hot part of the liquid heat exchanger.

In this embodiment the lowering of the cartridge 41 will, besides, result in that, in a given case, the further boiling in the boiler or the operation of the circulating pump 30 will cease. When this circulation ceases, the gas circulation will also cease, thus still further hastening the defrosting of the evaporator.

Instead of making the heating cartridge 41 displaceable in height it is also possible to use a long cartridge with several windings of which the upper windings heat the boiler and the circulating pump, whereas the lower winding, which heats the pump 40, may be separately started or stopped by hand or thermostatically.

Fig. 3 shows an embodiment in which the additional pump delivers not directly into the evaporator but to the highest point of the apparatus, namely, into the pressure vessel 21 located above the condenser.

The tubular boiler 11 and the circulating pump 30 are, as in Fig. 1, connected to the heating tube 10. The additional pump 40 is in heat-conducting connection with a special tube 50. The heating tube 50 may be heated in any suitable manner, as by the same means as the heating tube 10 or by other means.

The transport of the absorption solution to an especially high point makes it possible to use the transported solution also for other purposes. In the embodiment itself the transported solution passes from the pressure vessel 21 through the connecting conduit 24 to the liquid seal 16 of the evaporator, flowing therefrom into the evaporator, not shown. However, the raised solution may, particularly in this case, be used also for other purposes.

An anti-corrosive agent is generally introduced into hermetically closed refrigerating apparatus of the kind described herein and shown in the drawings. There are, however, places where the water vapours evolved condense. These condensing water vapours contain no protecting agent of chromate, for which reason rust may form. Such a place is the gas heat exchanger in which water vapours are deposited from the poor gas coming from the absorber at the change of temperature resulting from the cold gas mixture. It is now possible to use the solution raised by the additional pump and containing chromate for rinsing the gas heat exchanger, thus removing the water containing no protecting agent and, as the liquid is displaced or replaced by a solution containing chromate, preventing the gas heat exchanger from rusting on the inside. This additional advantage of the special pump 40 may be already obtained in the above-mentioned defrosting process, because the solution overflows from the evaporator into the heat exchanger, flowing from the latter through the conduit 23 into the absorber collector.

It will be obvious to those skilled in the art that various other changes may be made in the method and arrangement without departing from the spirit of the invention and therefore the invention is not limited to what is shown in the drawings and described in the specification but only as indicated in the claims.

What I claim is:

1. A continuously operating absorption refrigerating apparatus utilizing a pressure equalizing gas, said apparatus comprising a boiler, a condenser, an evaporator, an absorber and a pressure vessel interconnected to provide a closed hermetically sealed unit, said pressure vessel being located at the top of the apparatus, a vapor lift pump for continuously circulating absorption solution between the boiler and absorber during normal operation, and a second pump for absorption solution and connected to deliver absorption solution to the pressure vessel for gravity flow through other parts of the apparatus, said second pump being operable at will to supply absorption solution to the other parts of the apparatus.

2. Absorption refrigerating apparatus according to claim 1 so constructed and arranged as to cause the absorption solution delivered by the second pump to displace liquid from other parts of the apparatus.

3. An absorption refrigeration system having a cooling element, an absorption liquid circuit in which the liquid is heated, a first gas lift pump for causing circulation of liquid in said circuit, a second gas lift pump operable for delivering heated absorption liquid from said circuit to said cooling element to quickly raise the temperature thereof, and an electrical heating element movable from one position in which it is primarily effective to operate said first gas lift pump to another position in which it is primarily effective to operate said second gas lift pump.

4. An absorption refrigeration system having a cooling element, an absorber, a generator, an absorption liquid circuit including said generator and said absorber, and a device including an electrical heating element movable from one heating position to another heating position to cause absorption liquid to be delivered from said circuit to said cooling element and simultaneously reduce flow of liquid in said circuit to said absorber, thereby quickly raising the temperature of said cooling element.

5. An absorption refrigeration system having a plurality of interconnected parts at different levels and in some of which absorption liquid does not normally pass, one such part being the uppermost part of the system, other of said parts being connected to provide a circuit through which absorption liquid normally circulates and in which the liquid is heated, a first gas lift pump for causing circulation of liquid in said circuit, and a second gas lift pump operable for delivering heated absorption liquid from said circuit to said one uppermost part for gravity flow through one or more other parts of the system in which absorption liquid does not normally pass.

6. An absorption refrigeration system having a plurality of interconnected parts including a cooling element, at least one of said parts being disposed at a higher level than said cooling element and constituting the highest located part in the system, a circuit for absorption liquid including a heat receiving part, and a heat operated device associated with said circuit and said highest located part which is operable when heat is supplied thereto for delivering absorption liquid from said circuit to said highest located part for gravity flow through one or more other parts of the system in which absorption liquid does not normally pass.

7. In the art of refrigeration with the aid of a system in which absorption liquid containing a corrosion inhibiting substance normally circulates through and between a place of vapor expulsion and a place of absorption and in which the expelled vapor is converted to liquid at a place of liquefaction, vaporizes at a place of vaporization and such vapor is absorbed into solution at the place of absorption, the improvement which comprises intermittently withdrawing absorption liquid from its circuit and delivering such withdrawn liquid to the highest place in the system, and flowing such absorption liquid by gravity from the highest place through one or more places in the system in which absorption liquid does not normally pass.

8. In the art of refrigeration as set forth in claim 7, the improvement which comprises flowing absorption liquid by gravity from the highest place in the system through the place of vaporization.

9. In the art of refrigeration as set forth in claim 7 in which the absorption liquid is water, the improvement which comprises flowing absorption liquid containing the corrosion inhibiting substance by gravity from the highest place in the system through another place in the system in which absorption liquid does not normally pass and water vapor tends to condense, thereby inhibiting corrosion in such other place.

WILHELM GEORG KÖGEL.

REFERENCES CITED

The following references are of record in the file of this patent:

UNITED STATES PATENTS

| Number | Name | Date |
|---|---|---|
| 2,402,413 | Kögel | June 18, 1946 |